United States Patent
Itou

(10) Patent No.: US 7,465,055 B2
(45) Date of Patent: Dec. 16, 2008

(54) ROTARY OPERATION MECHANISM, ELECTRONIC APPARATUS AND PROJECTOR

(75) Inventor: Yasushi Itou, Tokyo (JP)

(73) Assignee: NEC Viewtechnology, Ltd., Minato-ku, Tokyo (JP)

( * ) Notice: Subject to any disclaimer, the term of this patent is extended or adjusted under 35 U.S.C. 154(b) by 161 days.

(21) Appl. No.: 11/106,660

(22) Filed: Apr. 15, 2005

(65) Prior Publication Data
US 2005/0264771 A1   Dec. 1, 2005

(30) Foreign Application Priority Data
Apr. 16, 2004 (JP) .............................. 2004-121334

(51) Int. Cl.
*G03B 21/00* (2006.01)
(52) U.S. Cl. ..................................................... 353/122
(58) Field of Classification Search ................. 353/101, 353/122; 200/336, 564, 566
See application file for complete search history.

(56) References Cited

U.S. PATENT DOCUMENTS

| | | | | |
|---|---|---|---|---|
| 4,270,394 | A * | 6/1981 | Ito et al. ...................... | 74/10 R |
| 4,339,181 | A * | 7/1982 | Link et al. ................. | 353/27 R |
| 4,504,706 | A * | 3/1985 | Watanabe et al. ......... | 200/11 R |
| 4,939,990 | A * | 7/1990 | Inaguma et al. ............. | 101/109 |
| 6,998,553 | B2* | 2/2006 | Hisamune et al. ........... | 200/336 |
| 7,055,479 | B2* | 6/2006 | Sailer et al. .............. | 123/90.59 |
| 7,223,926 | B1* | 5/2007 | Gannon et al. ............ | 200/11 R |
| 2007/0052935 | A1* | 3/2007 | Nakamura ................... | 353/101 |

FOREIGN PATENT DOCUMENTS

| | | |
|---|---|---|
| JP | 53114052 | 2/1952 |
| JP | 62-14703 | 1/1987 |
| JP | 62-32416 | 2/1987 |
| JP | 7-282668 | 10/1995 |
| JP | 8-211957 | 8/1996 |
| JP | 8-329776 | 12/1996 |
| JP | 11-144564 | 5/1999 |
| JP | 2000-077215 | 3/2000 |
| JP | 2003-315917 | 11/2003 |

OTHER PUBLICATIONS

Japanese Office Action dated Jun. 20, 2007 with a partial English translation.

* cited by examiner

*Primary Examiner*—Christopher Mahoney
(74) *Attorney, Agent, or Firm*—McGinn IP Law Group, PLLC

(57) ABSTRACT

A rotary operation mechanism is provided with: a gear that is rotatably provided in the apparatus main unit of an electronic apparatus that is provided with an apparatus main unit and an outer case that covers this apparatus main unit; a rotating knob for effecting the rotary operation of this gear; and an opening that is provided in the outer case and into which the rotating knob is inserted. The rotating knob is supported in the outer case in a state of engagement that allows free rotation inside the opening. The rotating knob is provided with a first rib at a position that is separated in the radial direction from the center of rotation, and the gear is provided with a second rib that forms a gap in which the first rib is interposed and that thus makes line contact with and engages with the first rib.

21 Claims, 16 Drawing Sheets

A-A

B-B

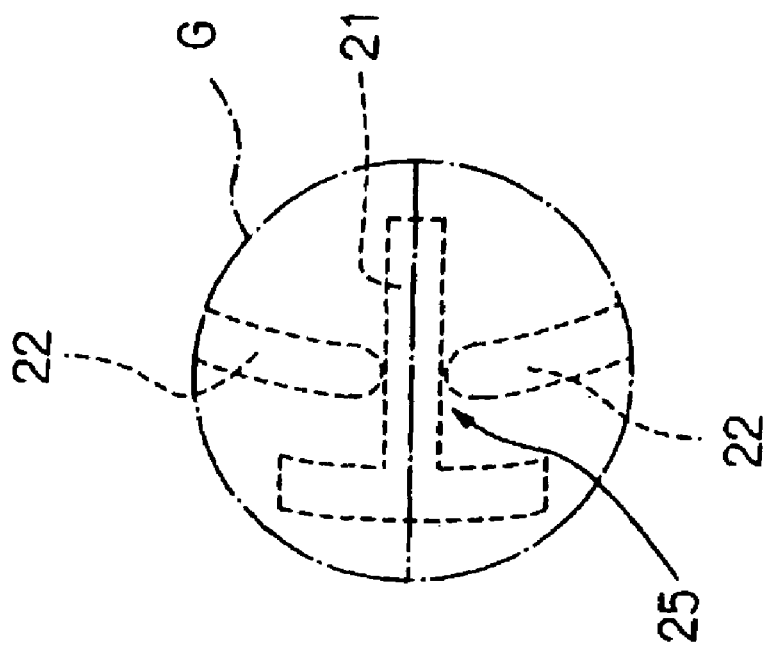
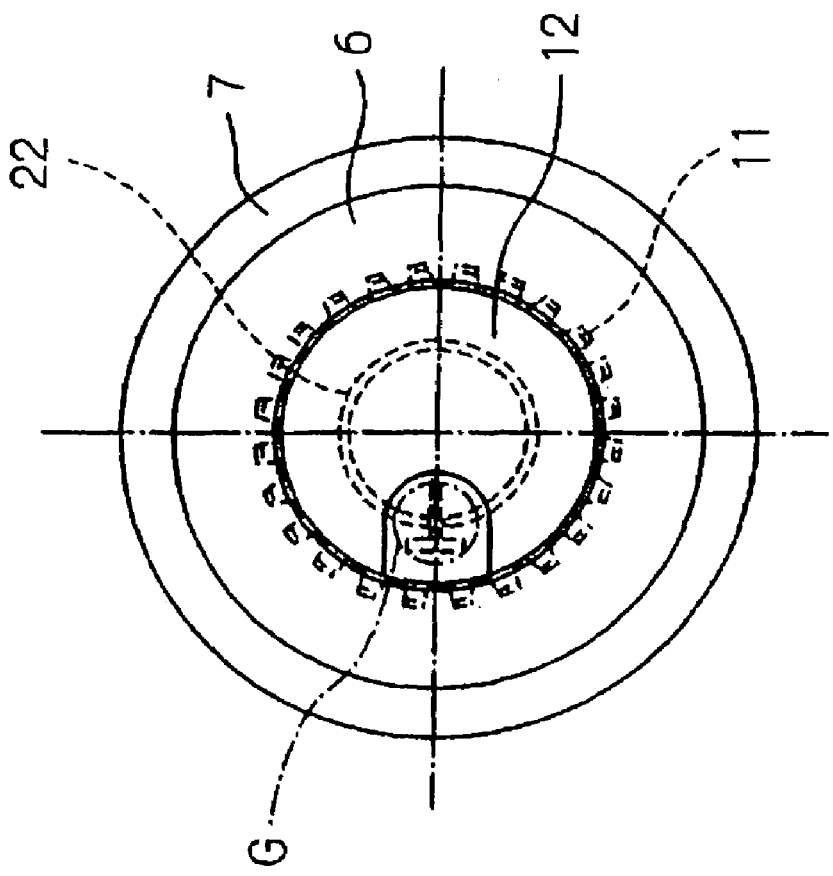

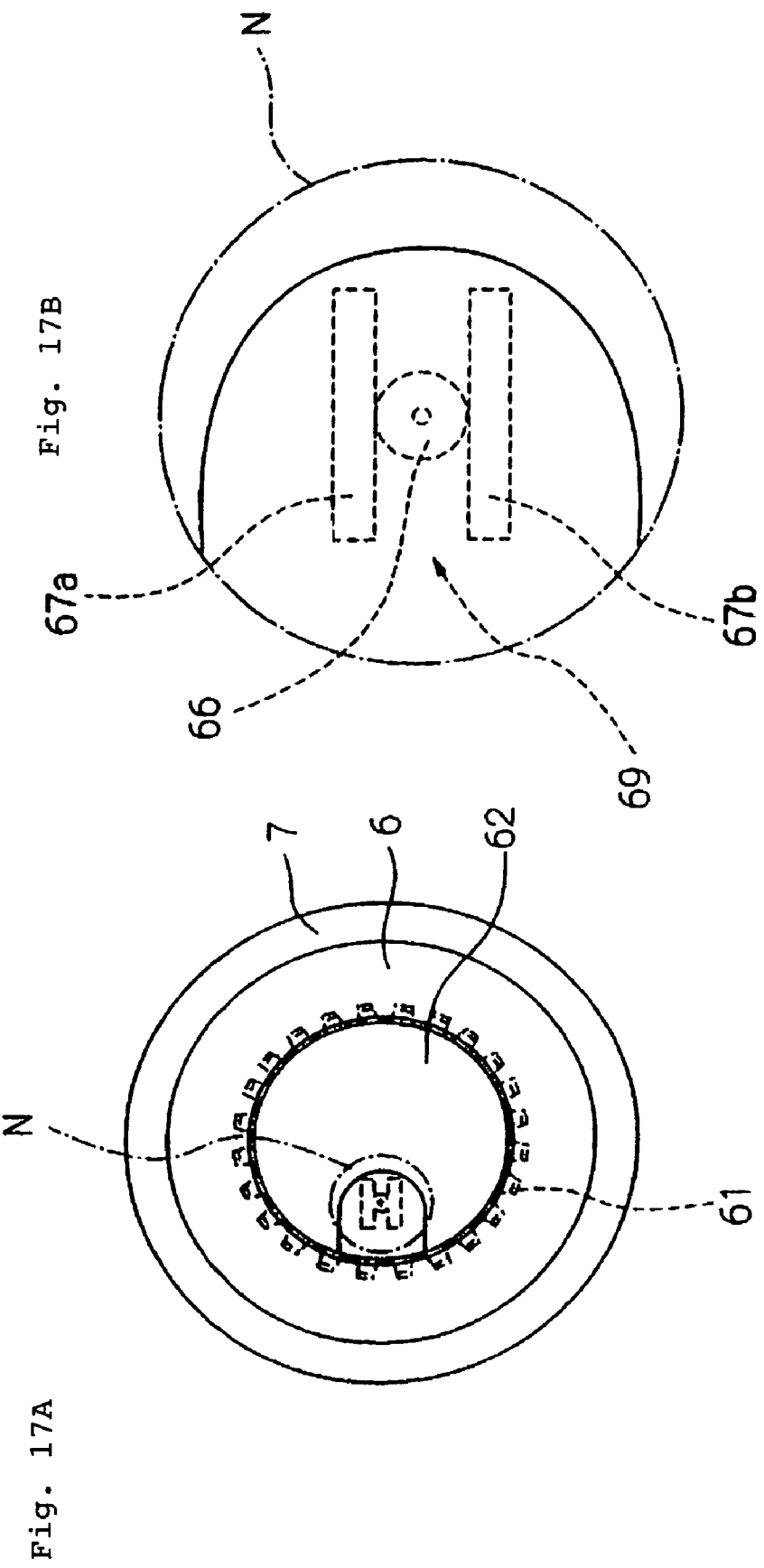

ROTARY OPERATION MECHANISM, ELECTRONIC APPARATUS AND PROJECTOR

BACKGROUND OF THE INVENTION

1. Field of the Invention

The present invention relates to a rotary operation mechanism, and to an electronic apparatus and a projector that are equipped with a rotating operator for effecting rotary operation of a rotary member such as a variable resistor.

2. Description of the Related Art

Some electronic apparatuses are provided with rotary operation mechanisms having rotating knobs for performing various operations. In one known form of this type of rotary operation mechanism, a mechanism in which a rotating knob for operating the main unit of the apparatus is arranged on the outer case that covers the main body of the electronic apparatus.

As a rotary operation mechanism of the prior art, Japanese Patent Laid-Open Publication No. 144564/99 discloses a configuration that is provided with a rotary electronic component that is provided on a printed wiring board and a rotary operator for realizing rotary operation of this rotary electronic component; and in which the rotary operator is composed of a first operation member that is freely rotatably installed in an opening of the case and a second operation member that is assembled with the first operation member.

Conventionally, when a rotating knob is arranged on the exterior of an outer case for realizing the rotary operation of an internal rotating part such as an adjustment gear or a rotary variable resistor that is provided inside the main unit of an electronic apparatus, the following various structures have been adopted while taking into consideration such issues as: divergence in the relative position of the internal rotating part and the rotating knob that accompanies error in the assembly of the apparatus main unit and the outer case; the design of the external appearance of the outer case; the feel of operating the rotating knob; and the workability of assembly.

(i) In a configuration in which a substantially cylindrical engagement part is formed on a rotating knob and in which this engagement part is freely rotatably engaged in an opening of the outer case, an opening is provided having an inside diameter that is somewhat greater than the outside diameter of the engagement part of the rotating knob, and the rotating knob is arranged to project toward the outside of the outer case such that the outer periphery of the rotating knob overlaps the opening of the outer case to thereby conceal the opening in the outer case from view from the outside.

(ii) Engaging and supporting a rotating knob on the outer case side secures a relatively large clearance, this clearance being the gap when the rotating knob is imposed upon the internal rotating part.

(iii) A large clearance is maintained between a rotating knob and the opening in an outer case such that the rotating knob does not rub against the inside of the opening in the outer case even when divergence occurs in the relative position of the rotating knob and the internal rotating part.

(iv) After accurately positioning and attaching rotating knobs with respect to the openings of an outer case, the internal rotating parts are secured one by one.

However, despite the adoption of the above-described measures (i)-(iv) in a rotary operation mechanism of the prior art, several problems occur.

Specifically, in a rotary operation mechanism of the prior art, when priority is given to preventing divergence in position between a rotating knob and the opening of the outer case, a greater amount of clearance must be secured between the rotating knob and the internal rotating part. As a result, when rotating the rotating knob, the problem arises that the rotating knob exhibits idle movement and play with respect to the internal rotating part.

On the other hand, if priority is given to eliminating any free play of the rotating knob and the rotating knob is assembled with minimum clearance with respect to the internal rotating part, a large amount of clearance must be secured between the rotating knob and the opening in the outer case, and the problem therefore arises that divergence occurs in the positions of the rotating knob and the opening.

This divergence in position of the rotating knob with respect to the opening can be made less noticeable by arranging the rotating knob to project away from the outer case. However, this solution imposes limitations on the outside design of the outer case.

Accordingly, for absorbing the assembly error between the outer case and the apparatus main unit and allowing smooth and binding-free rotation of a rotating knob inside the opening in the outer case, this rotating knob being assembled with an internal rotating part provided in the apparatus main unit, necessitates the sacrifice of either the feel of operating the rotating knob or the outside design of the outer case.

Alternatively, after accurately positioning the rotating knob with respect to the opening in the outer case, the rotating knob must be imposed on the internal rotating part. This solution results in an assembly having poor workability and a high rate of assembly defects. These problems become particularly significant when a plurality of rotating knobs is provided for allowing rotary operation of a plurality of internal rotating parts.

SUMMARY OF THE INVENTION

It is an object of the present invention to provide a rotary operation mechanism, an electronic apparatus, and a projector in which the divergence in relative position that occurs between a rotary operator and rotating member and that accompanies assembly error between the main unit of an apparatus main unit and its case can be absorbed, and in which idle movement, i.e., play in the rotary operator with respect to the rotary member can be suppressed.

To achieve the above-described objects, the rotary operation mechanism according to the present invention is provided with: a rotating member that is rotatably provided in the apparatus main unit of an electronic apparatus that is provided with an apparatus main unit and a case that covers this apparatus main unit; a rotary operator for effecting rotary operation of this rotating member; and an opening that is provided in the case and in which the rotary operator is inserted. In addition, the rotary operator is supported by the case in a state of engagement that allows free rotation in the opening. One of the rotary operator and rotating member is provided with a first engagement part at a position that is separated in the radial direction from the center of rotation, and the other is provided with a second engagement part that forms a gap in which the first engagement part is interposed and that line contacts and engages with the first engagement part.

According to the rotary operation mechanism of the present invention that is configured as described above, the first engagement part and the second engagement part make line contact and engage with each other, whereby the first engagement part and the second engagement part are capable of relative rotation and are able to engage with each other at any position of rotation. Accordingly, despite the occurrence of divergence in the relative positions of the rotating member and the rotary operator that accompanies assembly error of the apparatus main unit and case, a certain degree of the divergence in the relative positions of the rotating member and the rotary operator is absorbed by providing an angle of rotation in which the rotary operator and the rotating member, which are respectively provided with a first engagement part and a second engagement part, undergo relative rotation. As a result, the rotary operation mechanism of the present invention allows the rotary operator that is engaged with the rotating member to rotate smoothly without hindrance from the opening of the case.

Further, at the time of fabrication in the rotary operation mechanism of the present invention, the assembly of the case in which the rotary operator is supported with the apparatus main unit that is provided with the rotating member allows a suppression of the occurrence of divergence in the relative positions of the rotating member that is provided in the apparatus main unit and the rotary operator that is supported by the case, and as a result, the workability of assembly is improved. In addition, the engagement of the first engagement part and the second engagement part that make line contact with minimum clearance prevents the occurrence of idle movement (play) in the rotary operator with respect to the rotating member.

The electronic apparatus according to the present invention is provided with the above-described rotary operation mechanism of the present invention.

The projector according to the present invention is provided with: the above-described rotary operation mechanism of the present invention, projection optics for projecting an image; and a drive mechanism for moving a lens that belongs to these projection optics. The drive mechanism is operated by the rotary operator of the rotary operation mechanism. The apparatus main unit in the present invention refers to, for example, a support structure such as a chassis or an electronic circuit structure such as a printed circuit board. In addition, the rotating member in the present invention refers to, for example, a rotary-type electronic component such as a rotary switch or a rotary volume, or a gear for driving various mechanisms.

According to the present invention as described hereinabove, when a rotary operator and a rotating member are engaged, the rotation of the rotating member with respect to the rotary operator absorbs the assembly error between the apparatus main unit and case. Thus, according to the present invention, a rotary operator that is engaged with a rotating member can be rotated smoothly without receiving any resistance in the opening in the case, whereby excellent operation feel can be obtained.

The present invention can further prevent idle movement (play) of the rotary operator during rotation operation, can prevent visible divergence in the position of the rotary operator with respect to the opening of the case, and can ease restrictions on the outside design of the case.

Finally, the present invention is a structure that absorbs the assembly error in the relative positions of the apparatus main unit and case at the time of fabrication, and therefore can realize an improvement in the workability of assembly, a reduction in the rate of assembly defects, and an improvement in the production efficiency.

The above and other objects, features, and advantages of the present invention will become apparent from the following description with reference to the accompanying drawings, which illustrate examples of the present invention.

BRIEF DESCRIPTION OF THE DRAWINGS

FIG. 8A is a plan view showing the alignment of the centers of rotation of each of the rotating knob and the gear;

FIG. 8B is an enlarged partial view showing the alignment of the centers of rotation of each of the rotating knob and the gear;

FIG. 17A is a plan view for explaining the other gear; and

FIG. 17B is a through-view plan view for explaining the other gear.

DETAILED DESCRIPTION OF THE PREFERRED EMBODIMENTS

First Embodiment

Figure 1:
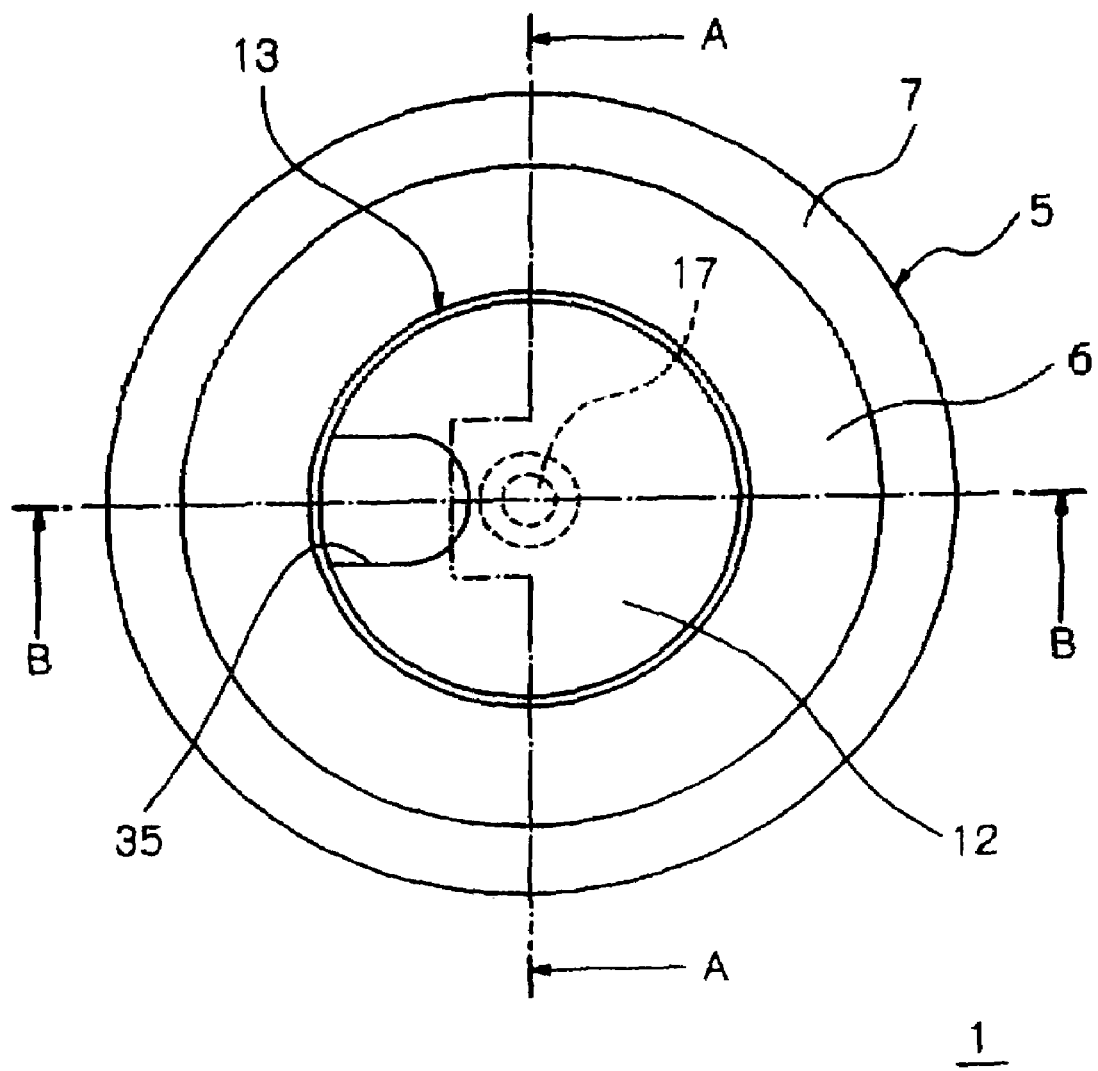
FIG. 1 is a plan view showing the rotary operation mechanism according to the present invention.

The rotary operation mechanism of the present embodiment is applied to, as an electronic apparatus, a projector that projects an image on a projection surface, the rotary operation mechanism being used for manually operating a zoom mechanism for enlarging or reducing the image. As shown in FIG. 1, the projector is provided with: apparatus main unit 5, and outer case 6 for covering this apparatus main unit 5.

As shown in FIGS. 1-4, rotary operation mechanism 1 of the present embodiment is provided with: gear 11, which is the rotating member that is rotatably provided in apparatus main unit 5; rotating knob 12, which is the rotary operator for effecting rotary operation of gear 11; and depression 13 that has opening 15 into which this rotating knob 12 is inserted.

As shown in FIG. 3, FIG. 4, and FIGS. 6A-6C, gear 11 is formed as a single unit with shaft hole part 18 in the center through which passes rotation shaft 17, this rotation shaft 17 being provided in chassis 7 of apparatus main unit 5. Shaft hole 18a is provided so as to pass through this shaft hole part 18, and rotation shaft 17, on which gear 11 is rotatably supported, passes through this shaft hole 18a. This shaft hole 18a is formed to have a minimum clearance with rotation shaft 17, whereby rotation shaft 17 fits into shaft hole 18a that has been formed with minimum clearance and gear 11 rotates with the axis of rotation shaft 17 as the center of rotation without occurrence of idle rotation, i.e., play. In addition, geared part 19 that meshes with the gear train (not shown) of the zoom mechanism is formed around the entire circumference of gear 11.

Further, second rib 22, which is an engagement part that engages with first rib 21 of rotating knob 12 (to be explained hereinbelow), is formed as a single unit with gear 11 to project from gear 11 concentrically with geared part 19. This second rib 22 is formed in a substantially ring shape, and is formed with one portion in the circumferential direction cut out to form slit 25 that serves as a gap that engages with first rib 21 of rotating knob 12.

The distance between opening edges 25a of this slit 25 is formed to a prescribed distance having a minimum clearance, this distance being equal to the thickness t of first rib 21 of rotating knob 12 to which a prescribed clearance is added. Each end surface of opening edges 25a of this slit 25 is formed as arc-shaped curved surface that take as radius the dimension of approximately half of the thickness of second rib 22. In addition, guiding inclined surfaces 26 are formed on the upper edge side of these opening edges 25a for guiding first rib 21 into slit 25 when rotating knob 12 is imposed on gear 11.

Figure 2:
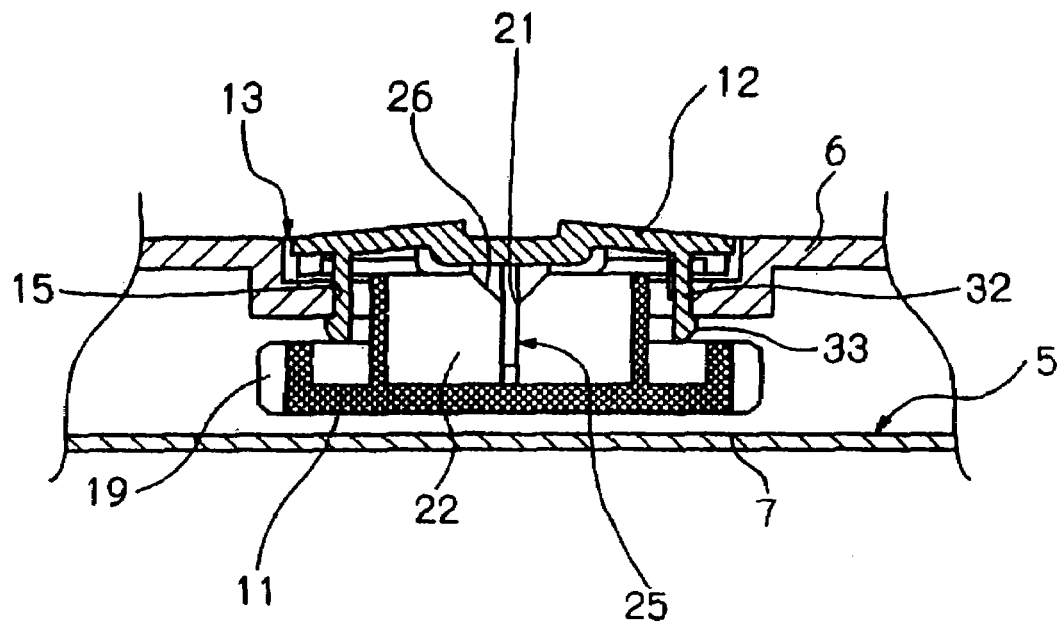
FIG. 2 is a sectional view at A-A showing the rotary operation mechanism.
Figure 3:
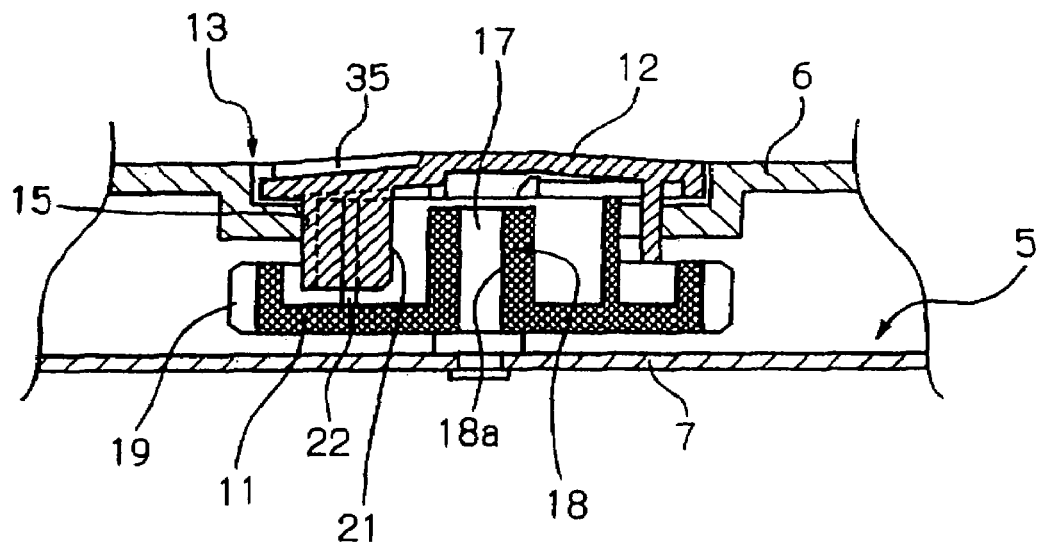
FIG. 3 is a sectional view at B-B showing the rotary operation mechanism.
Figure 4:
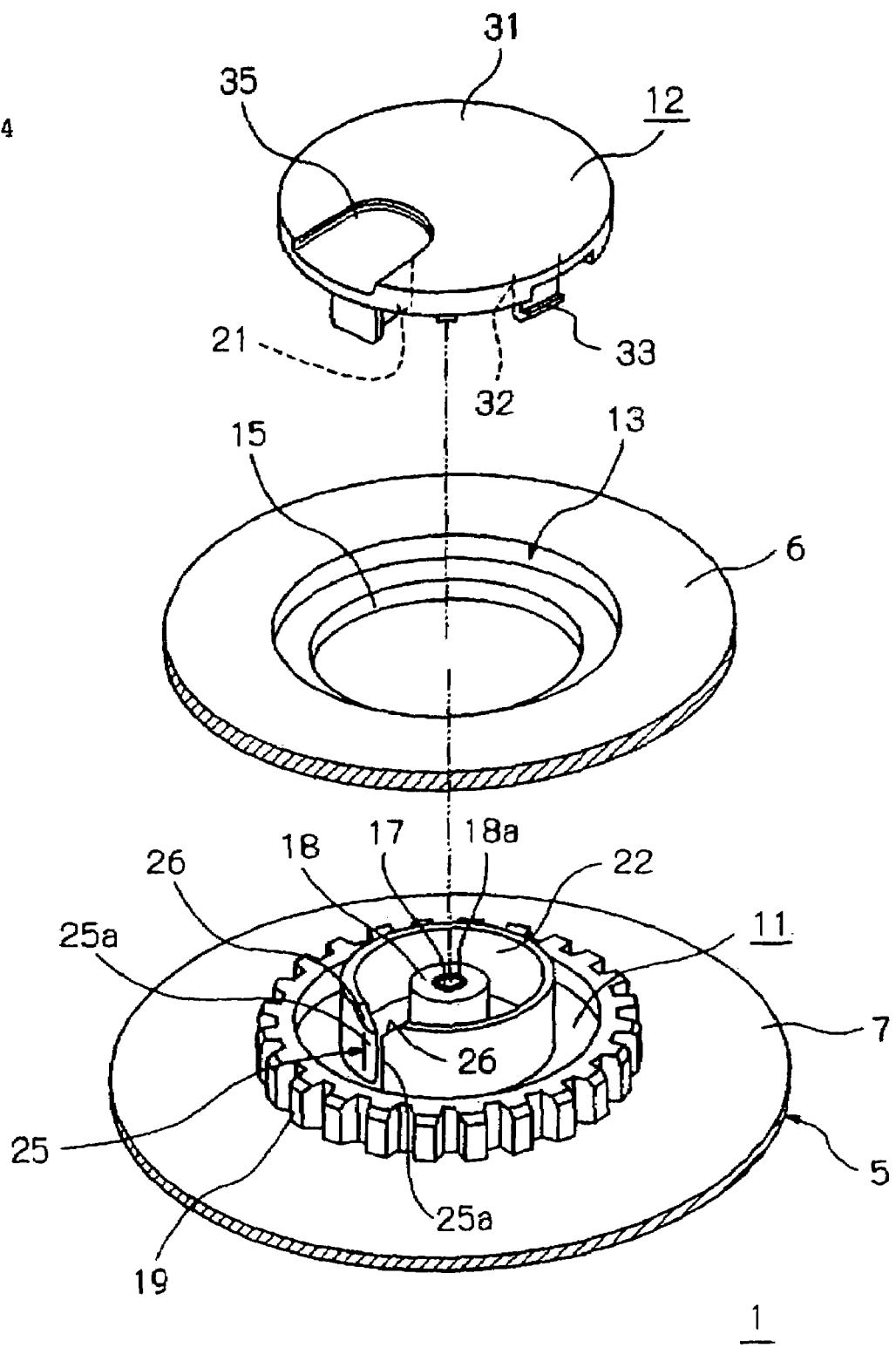
FIG. 4 is an exploded perspective view showing the rotary operation mechanism.
Figure 5:
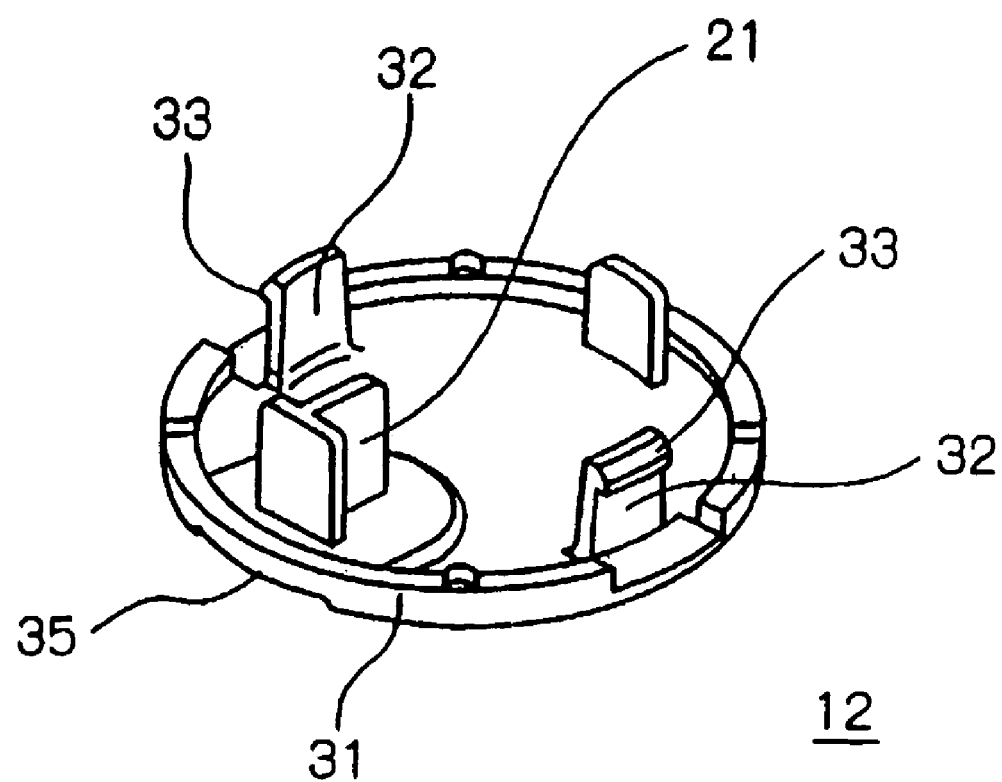
FIG. 5 is a perspective view showing the bottom surface of the rotating knob.
Figure 6B:
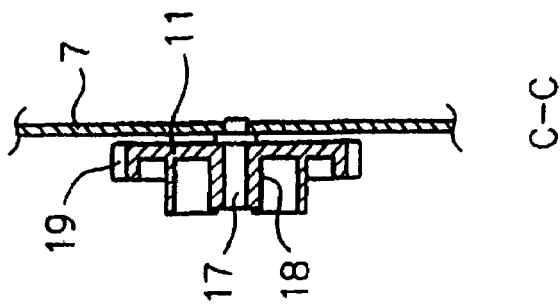
FIG. 6B is a sectional view for explaining the gear.
Figure 6A:
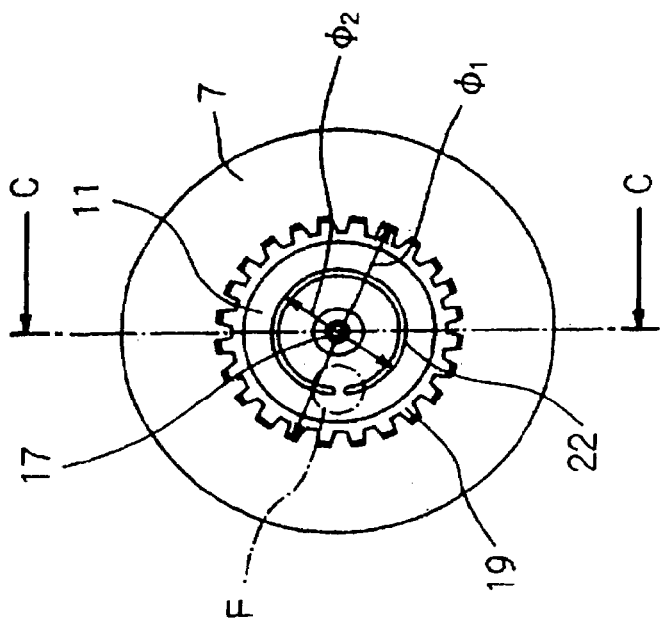
FIG. 6A is a plan view for explaining the gear.
Figure 6C:
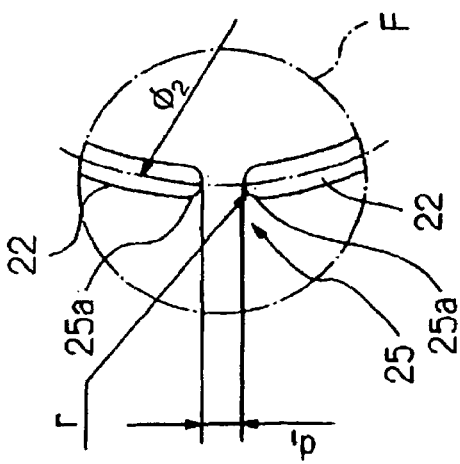
FIG. 6C is an enlarged partial view for explaining the gear.
Figure 7B:
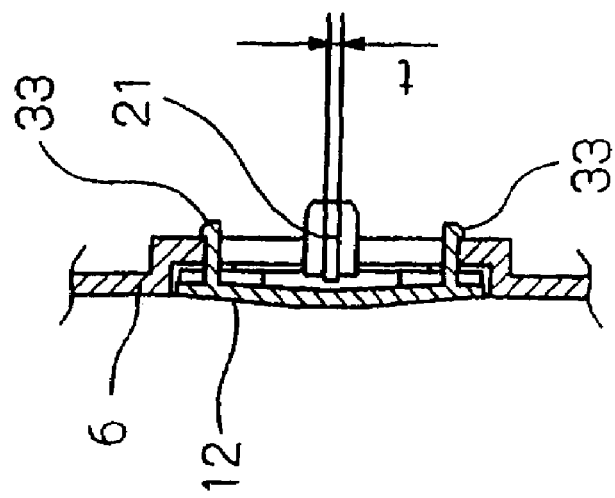
FIG. 7B is a sectional view showing the assembly of the rotating knob on the outer case.
Figure 7A:
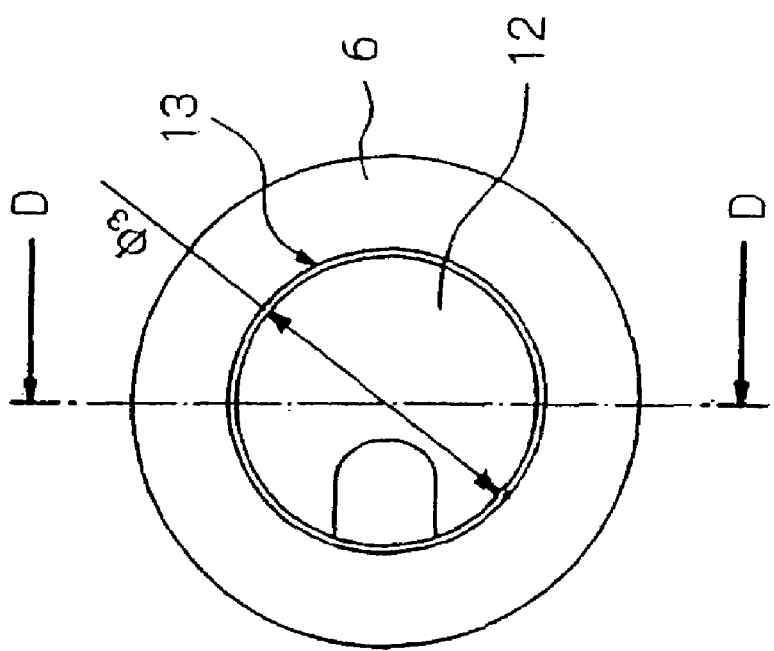
FIG. 7A is a plan view showing the assembly of the rotating knob on the outer case.

As shown in FIG. 4, FIG. 5, and FIGS. 7A and 7B, rotating knob 12 has manipulation part 31 for effecting rotary operation and a plurality of engagement tabs 32 for engaging with opening 15 in depression 13 while allowing free rotation. Manipulation part 31 is formed in a substantially disk shape having an outer diameter that is larger than the inner diameter of opening 15. As shown in FIG. 2 and FIG. 5, each of engagement tabs 32 is formed along the periphery of the bottom of manipulation part 31 to allow elastic displacement, and engagement catches 33 that engage with the inner edge of opening 15 are formed at the tips of engagement tabs 32.

Engagement catches 33 engage with the inner edge of opening 15, whereby rotating knob 12 is freely rotatably supported in outer case 6. In rotating knob 12, a slight clearance is secured between the inner edge surface of opening 15 and the outer periphery surface of each engagement tab 32. Each engagement tab 32 is engaged in opening 15 with a slight amount of clearance, and rotating knob 12 therefore rotates within opening 15 with an amount of play equivalent to this clearance.

In addition, first rib 21, which is an engagement part that engages with the above-described second rib 22 of gear 11, is formed as a single unit with rotating knob 12 to project from the bottom surface of rotating knob 12. This first rib 21 is formed at a position that is separated in the radial direction from center of rotation $O_1$ of rotating knob 12 in a plate shape that extends in the radial direction and intersects with the circumferential direction of above-described second rib 22. Accordingly, second rib 22 of gear 11 has opening edges 25a that are substantially orthogonal to the longitudinal direction of first rib 21 of rotating knob 12 and is formed along a circumference that takes the axis of rotation shaft 17 as center of rotation $O_2$. In addition, manipulation part 31 of rotating knob 12 is provided with fingertip depression 35 in which, for example, a finger can fit at a position that corresponds to first rib 21.

Depression 13 is provided on the external surface of outer case 6 with circular opening 15 formed to pass through its center. The inside diameter of this depression 13 is substantially equal to the outer diameter of rotating knob 12, and depression 13 is formed to a depth that is substantially equal to the thickness of rotating knob 12. The inside diameter of opening 15 is formed slightly smaller than the diameter of the circumscribed circle of engagement tabs 32 that are formed on rotating knob 12.

The dimensions of each part of rotating knob 12 and outer case 6, which is locked as a single unit to apparatus main unit 5 when rotation shaft 17 and gear 11 have been assembled, are formed with an amount of clearance that is at least the amount of expected divergence in the relative positions.

Apparatus main unit 5 and outer case 6 are locked together as a single unit at points not shown in the figures.

Explanation next regards the operations by which gear 11 is rotated by rotating knob 12 in rotary operation mechanism 1 that is configured according to the foregoing explanation.

First, by inserting engagement tabs 32 of rotating knob 12 into opening 15 in rotary operation mechanism 1, engagement tabs 32 are elastic displaced and engagement catches 33 engage with the inner rim of opening 15, whereby rotating knob 12 is supported inside depression 13 of outer case 6. In addition, when rotating knob 12 is imposed upon gear 11, first rib 21 is guided into slit 25 by guiding inclined surfaces 26 of second rib 22 and thus interposed in slit 25. The two side surfaces in the longitudinal direction of first rib 21 are thus engaged, with line contact along lines that are parallel to the axial direction of rotation shaft 17, by the apices of the curved surfaces of opening edges 25a of second rib 22.

First rib 21 and second rib 22 are thus capable of relative rotation on a plane that is orthogonal to the axial direction of rotation shaft 17. Accordingly, when rotating knob 12 is imposed on gear 11, this first rib 21 and second rib 22 engage at any rotation position of the relative rotation of first rib 21 and second rib 22.

The rotary operation of rotating knob 12 within depression 13 in rotary operation mechanism 1 causes first rib 21 of rotating knob 12 to rotate second rib 22 with which it is engaged, whereby gear 11 rotates. The rotation of gear 11 drives the zoom mechanism (not shown) that is provided in the apparatus main unit of projector, whereby, for example, the projector lens is caused to move in the direction of the optical axis to enlarge or reduce the projected image.

Explanation next regards the operation between gear 11 and rotating knob 12. FIGS. 8A and 8B shows the alignment of the center of rotation of gear 11 and the center of rotation of rotating knob 12, and FIGS. 9A and 9B show the occurrence of divergence in the relative positions of each of the centers of rotation.

In the present embodiment, as shown in FIGS. 6A-6C and FIGS. 7A and 7B, the diameter $ø_1$ of the addendum circle of geared part 19 of gear 11 is 34 mm, the diameter $ø_2$ of the circle described by the centerline of the thickness of second rib 22 is 30 mm, and outer diameter ø$_2$ of manipulation part 31 of rotating knob 12 is 18 mm.

In the present embodiment, as shown in FIGS. 6A-6C to FIGS. 9A and 9B, the thickness t of first rib 21 is 1 mm, and the distance d$_1$ between opening edges 25$a$ of slit 25 of second rib 22 is 1.1 mm, whereby a clearance of 0.1 mm is secured for first rib 21.

Figure 9B:
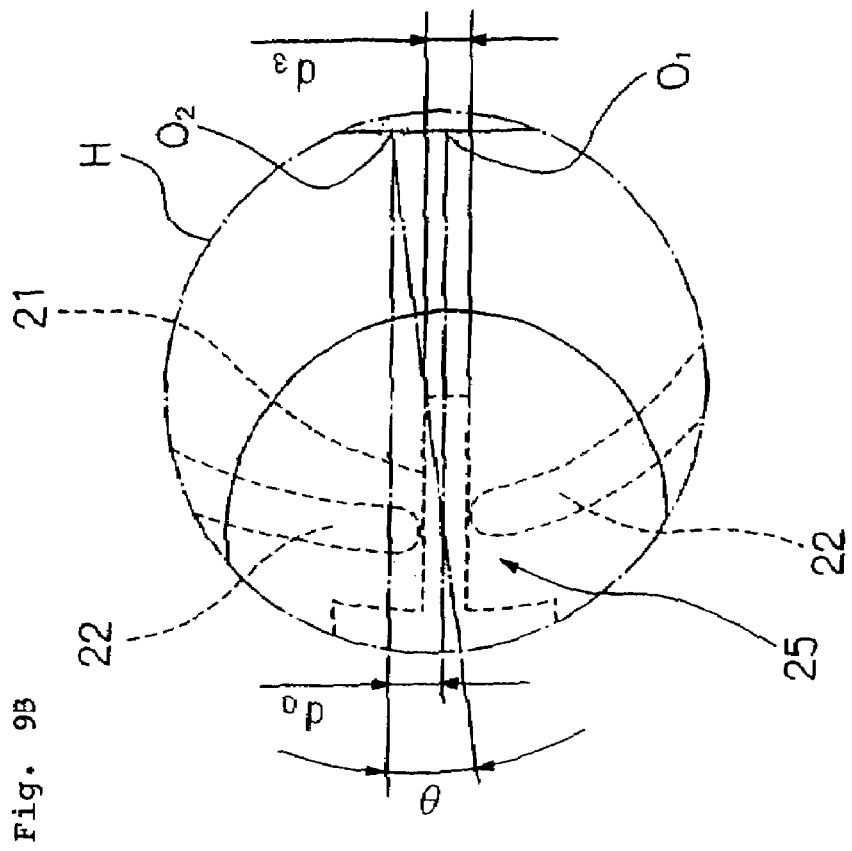
FIG. 9B is an enlarged partial view showing the occurrence of divergence in the positions of the centers of rotation of the rotating knob and the gear.
Figure 9A:
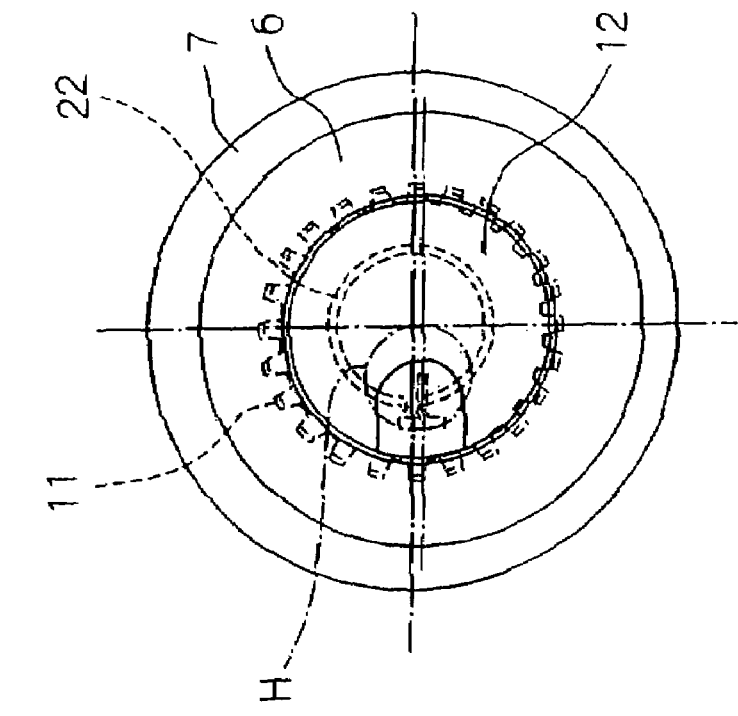
FIG. 9A is a plan view showing the occurrence of divergence in the positions of the centers of rotation of the rotating knob and the gear.
Figure 10:
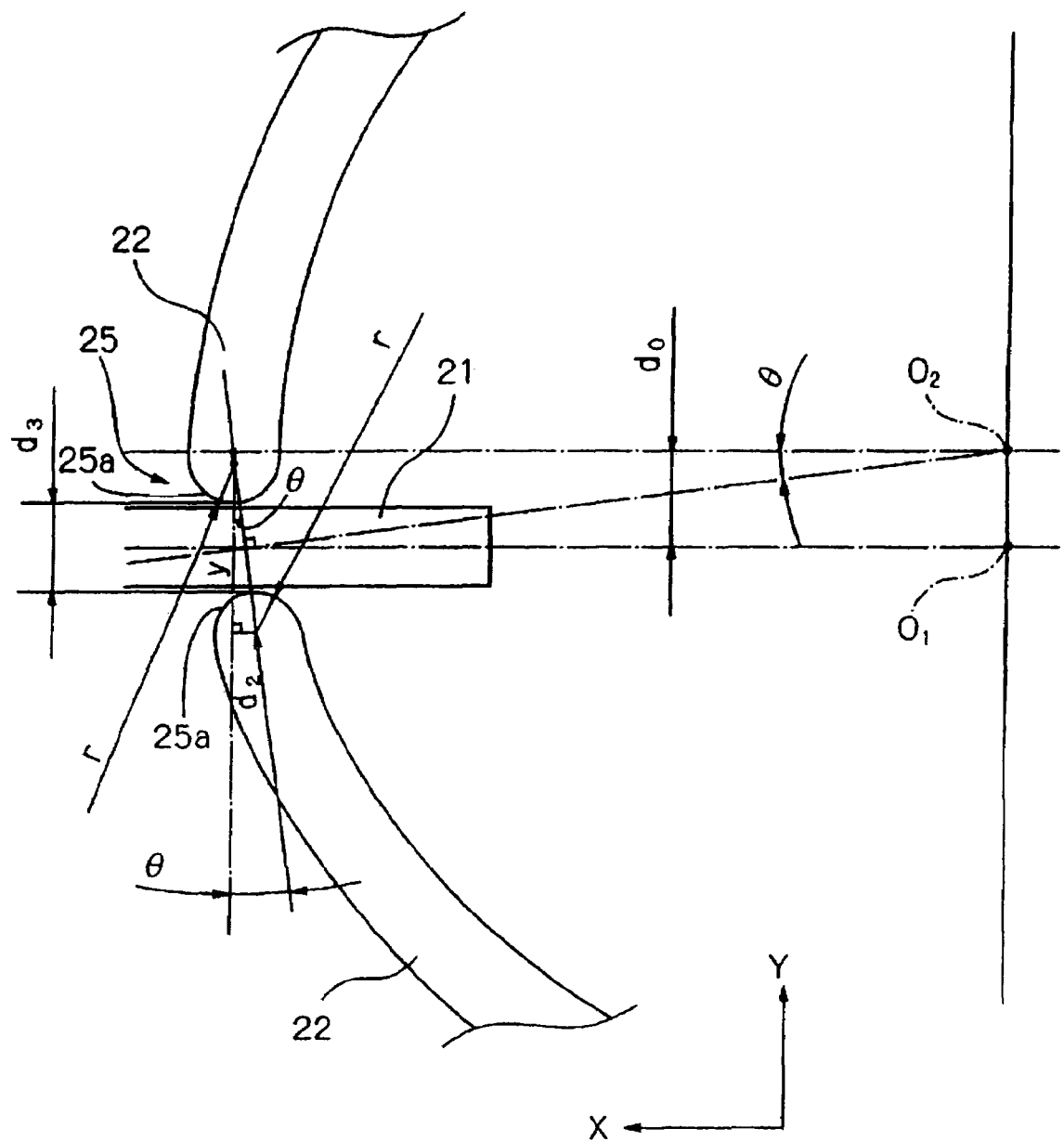
FIG. 10 is an enlarged view for explaining the divergence in relative positions of the rotating knob and the gear.
Figure 11B:
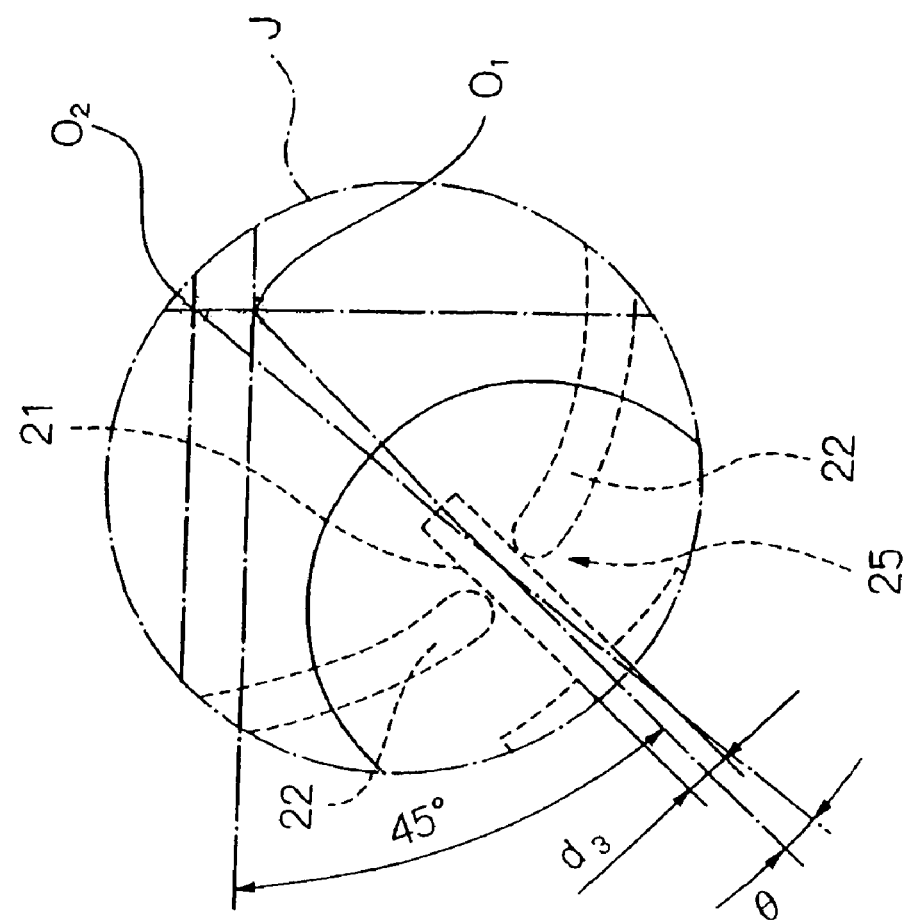
FIG. 11B is an enlarged partial view for explaining the 45-degree downward rotation of the first rib of the rotating knob with respect to the X-direction.
Figure 11A:
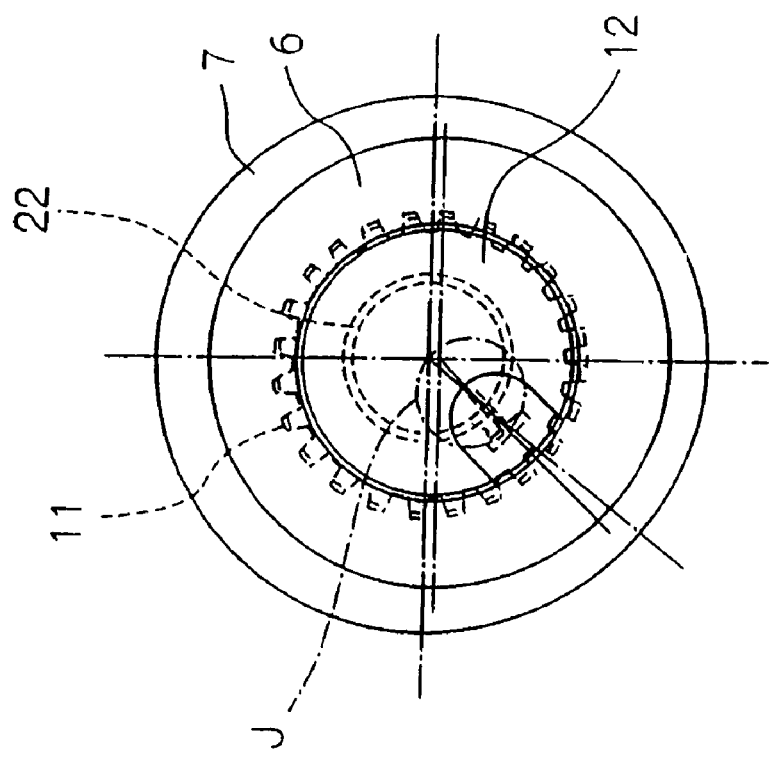
FIG. 11A is a plan view for explaining the 45-degree downward rotation of the first rib of the rotating knob with respect to the X-direction.
Figure 12B:
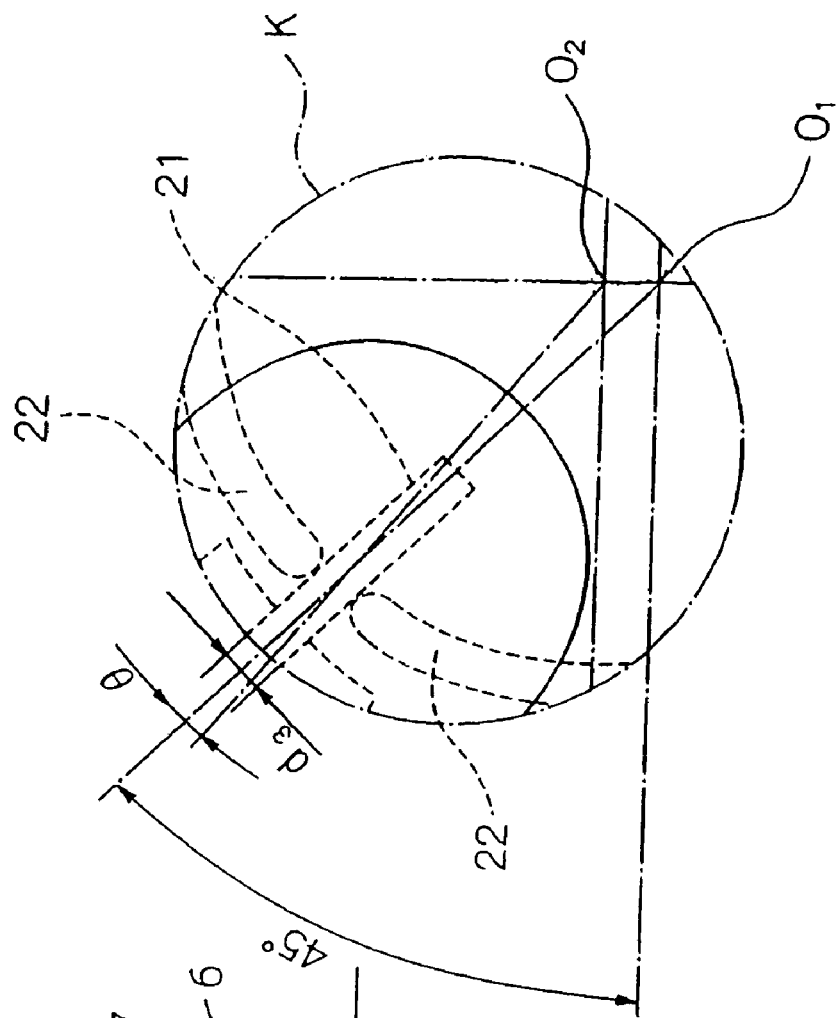
FIG. 12B is an enlarged partial view for explaining the 45-degree upward rotation of the first rib of the rotating knob with respect to the X-direction.
Figure 12A:
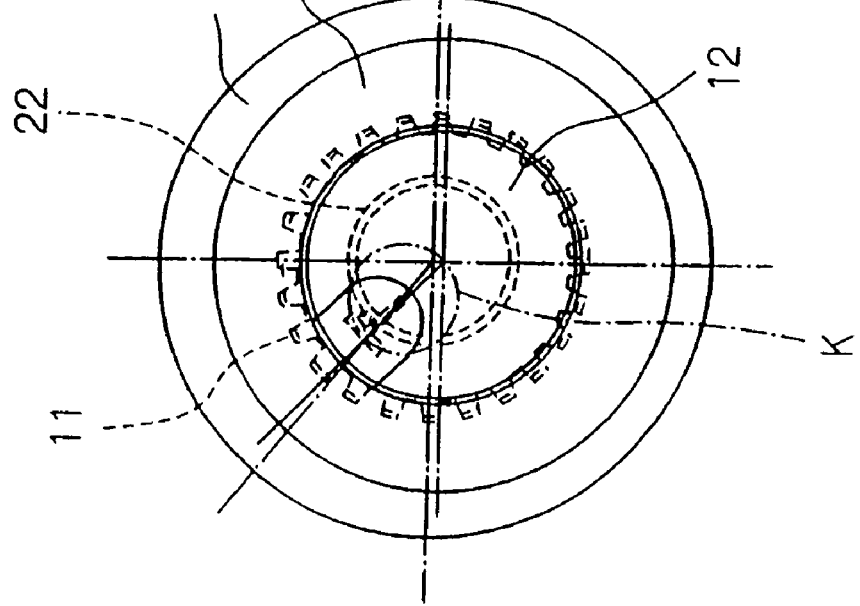
FIG. 12A is a plan view for explaining the 45-degree upward rotation of the first rib of the rotating knob with respect to the X-direction.

As shown in FIGS. 9A and 9B and FIG. 10, the divergence in relative position of the center of rotation O$_1$ of gear 11 and the center of rotation O$_2$ of rotating knob 12, i.e., the distance d$_0$ between each of the centers of rotation O$_1$ and O$_2$, is assumed to be 1.2 mm with respect to the Y-direction in FIG. 10.

When, as shown in FIGS. 8-10, the longitudinal direction of first rib 21 of rotating knob 12 is oriented parallel to the X-direction in FIG. 10, and distance d$_0$, which is the amount of divergence by which the relative position of the center of rotation O$_1$ of rotating knob 12 diverges in the Y-direction from the center of rotation O$_2$ of gear 11, is 1.2 mm, the two side surfaces in the longitudinal direction of first rib 21 of rotating knob 12 make line contact with the curved surfaces of opening edges 25$a$ of slit 25 and apply pressure against the curved surfaces of these opening edges 25$a$.

Gear 11 rotates under this applied pressure, and by moving to a position of rotation for which angle of rotation θ is approximately 8 degrees, the divergence in the relative positions of each of the centers of rotation O$_1$ and O$_2$ is absorbed. Explanation next regards the clearance between first rib 21 and opening edges 25$a$ of second rib 22 when thus absorbing this divergence in relative position.

As shown in FIGS. 9A and 9B and FIG. 10, distance d$_1$ between the end surfaces of opening edges 25$a$ of slit 25 of second rib 22 is 1.1 mm. Thus, when the curvature radius of the curvature of opening edges 25$a$ is 0.5 mm, distance d$_2$ between the centers of curvature of the curved surfaces that form the end surfaces of opening edges 25$a$ is calculated by:

$$d_2 = d_1 + 2r \quad \text{(Equation 1)}$$

The calculation d$_2$=1.1+(2×0.5)=2.1 accordingly yields the result that distance d$_2$ is 2.1 mm.

The angle of rotation θ that gear 11 rotates to absorb distance d$_0$, which is the amount of divergence in relative position of rotating knob 12 and gear 11, is approximately 8 degrees. The angle formed by the line segment of length y in the Y-direction and distance d$_2$ in the right triangle that is shown in the vicinity of slit 25 in FIG. 10 is equal to angle of rotation θ. Thus, because cos θ=y/d$_2$, the length y of the line segment is calculated from:

$$y = d_2 \times \cos\theta \quad \text{(Equation 2)}$$

Accordingly, the calculation y=2.1×cos 0.8=2.08 yields the result that line segment length y is 2.08 mm.

Subtracting the radius of curvature r of each of opening edges 25$a$ of slit 25 from this line segment length y (i.e., y−2r) gives distance d$_3$ between each of opening edges 25$a$ of second rib 22 in the direction that is parallel to the Y-direction. This calculation yields d$_3$=y−2r=2.08−(2×0.5)=1.08, whereby distance d$_3$ between first rib 21 and second rib 22 that includes clearance in the direction that is parallel to the Y-direction is found to be 1.08 mm.

Accordingly, subtracting thickness t of first rib 21 from distance d$_3$ (i.e., d$_3$−t) yields the clearance between first rib 21 and slit 25 of second rib 22 in the direction that is parallel to the Y-direction. This clearance is calculated as 1.08−1=0.08 to yield a clearance of approximately 0.08 mm. Thus, although this dimension is slightly less than the set clearance of 0.1 mm, this clearance can ensure excellent rotary operation in which the rotary operation of rotating knob 12 is not hindered.

Similarly, as shown in FIGS. 11A and 11B and FIGS. 12A and 12B, if distance d$_0$, which is the amount of divergence in position, is assumed to be 1.2 mm, at positions oriented in the direction parallel to the direction in which the longitudinal direction of first rib 21 of rotating knob 12 has been rotated upward 45 degrees (+45 degrees) and downward 45 degrees (−45 degrees) with respect to the X-direction, rotation of gear 11 to a position of rotation for which the angle of rotation θ is approximately 5 degrees for both cases absorbs the divergence in relative position that has occurred between centers of rotation O$_1$ and O$_2$ of rotating knob 12 and gear 11, respectively.

The clearance between first rib 21 and the opening edges 25$a$ of second rib 22 when the divergence in relative position is absorbed in this way is similarly calculated by the above-described Equation 1 and Equation 2. In each of the states shown in FIGS. 11A and 11B and FIGS. 12A and 12B, the calculation of y=2.1×cos 0.9=2.09 yields the calculation result:

$$d_3 = y - 2r = 2.09 - 1 = 1.09$$

Accordingly, the clearance between first rib 21 and second rib 22 in the direction parallel to the Y-direction is calculated by 1.09−1=0.09 to yield a dimension of approximately 0.09 mm. This clearance in the direction parallel to the Y-direction is slightly less than the set clearance of 0.1 mm, but as with the above-described case in which the longitudinal direction of first rib 21 is set parallel to the X-direction, excellent rotary operation of rotating knob 12 can be secured in which the rotation of rotating knob 12 is free of hindrance.

The state in which angle of rotation θ of the rotary operation for absorbing the divergence in relative position between the centers of rotation O$_1$ and O$_2$ of rotating knob 12 and gear 11 reaches a maximum occurs when the longitudinal direction of first rib 21 is parallel to the direction that is orthogonal to the direction of divergence in relative position. In the above-described example, the divergence in relative position occurs in the Y-direction, and the angle of rotation θ of rotary operation therefore reaches a maximum when the longitudinal direction of first rib 21 is parallel to the X-direction.

Accordingly, the space between first rib 21 of rotating knob 12 and opening edges 25$a$ of slit 25 reaches a minimum when the longitudinal direction of first rib 21 of rotating knob 12 is oriented parallel to the X-direction. In other words, when calculating the clearance in the direction that is parallel to the Y-direction between the above-described first rib 21 and slit 25 of second rib 22, cos θ is included in Equation 2 for calculating distance d$_3$. Thus, taking this cosine curve into consideration, as the angle of rotation θ increases over the range of angle of rotation θ from 0 to 90 degrees, the value of distance d$_3$ decreases and the clearance decreases. The gap between first rib 21 and opening edges 25$a$ therefore reaches a minimum.

As described in the foregoing explanation, excellent rotary operation can be secured even when the longitudinal direction of first rib 21 is oriented parallel to the X-direction. Thus, in rotary operation mechanism 1, the divergence in relative position of the centers of rotation O$_1$ and O$_2$ of rotating knob 12 and gear 11 is absorbed regardless of the orientation of the longitudinal direction of first rib 21 in any direction over 360 degrees, and hindrance of the rotary operation of rotating knob 12 can therefore be prevented.

As described hereinabove, rotary operation mechanism 1 suppresses the occurrence of divergence in relative position between rotating knob 12 that is supported by outer case 6 and gear 11 that is supported by apparatus main unit 5, this divergence being attendant to error in the assembly of apparatus main unit 5 and outer case 6.

According to rotary operation mechanism 1, excellent rotary operation of rotating knob 12 that is virtually free of idle rotation of rotating knob 12 can be achieved despite the occurrence of divergence in relative position between rotating knob 12 and gear 11. In addition, this rotary operation mechanism 1 can, by providing angle of rotation θ to each of the components in which first rib 21 and second rib 22 are formed, absorb to a certain degree the divergence in relative position between centers of rotation $O_1$ and $O_2$ of gear 11 and rotating knob 12 that is attendant to error in the assembly of apparatus main unit 5 and outer case 6. As a result, this rotary operation mechanism 1 allows smooth and resistance-free rotation of rotating knob 12 and enables excellent operation feel.

Rotary operation mechanism 1 provides a configuration that absorbs the assembly error in the relative positions of apparatus main unit 5 and outer case 6, whereby, in the fabrication process, assembling apparatus main unit 5 in which gear 11 is installed with outer case 6 in which rotating knob 12 is installed enables an improvement in the workability of assembly, a reduction of the rate of assembly defects, and an improvement in production efficiency.

Rotary operation mechanism 1 can prevent idle rotation of rotating knob 12 with respect to gear 11 and divergence in the apparent position of rotating knob 12 with respect to opening 15 of outer case 6, and further, because manipulation part 31 of rotating knob 12 does not project so as to overlie the external surface of outer case 6, can ease restrictions on the outside design of outer case 6.

Explanation next regards a rotary operation mechanism of another embodiment.

The basic configuration of the rotary operation mechanism of this other embodiment is substantially the same as that of the rotary operation mechanism of the above-described first embodiment, and parts that are identical to parts in the first embodiment are therefore identified by the same reference numerals, and explanation regarding these parts is omitted.

Second Embodiment

In rotary operation mechanism 1 that was described in the foregoing explanation, opening edges 25a of slit 25 of gear 11 were formed with curved surfaces having an arc shape. The following brief explanation regards the rotary operation mechanism of the second embodiment having another gear in which the opening edges are formed in another shape. With the exception of the second rib, this other gear has basically the same configuration as above-described gear 11, and parts that are identical to those in gear 11 are therefore given the same reference numerals and redundant explanation is here omitted.

Figure 13:
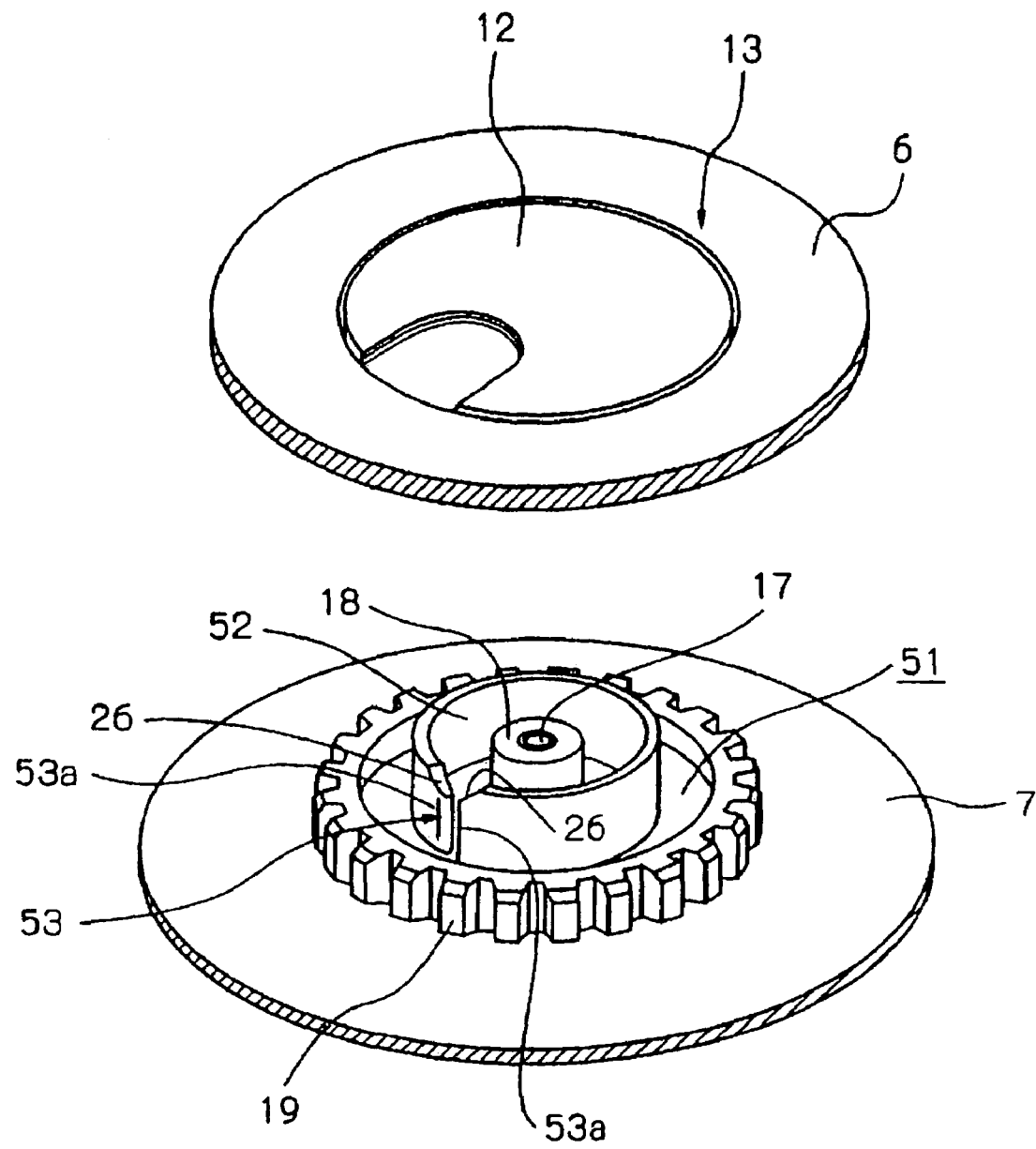
FIG. 13 is an exploded perspective view showing another rotary operation mechanism.
Figure 14B:
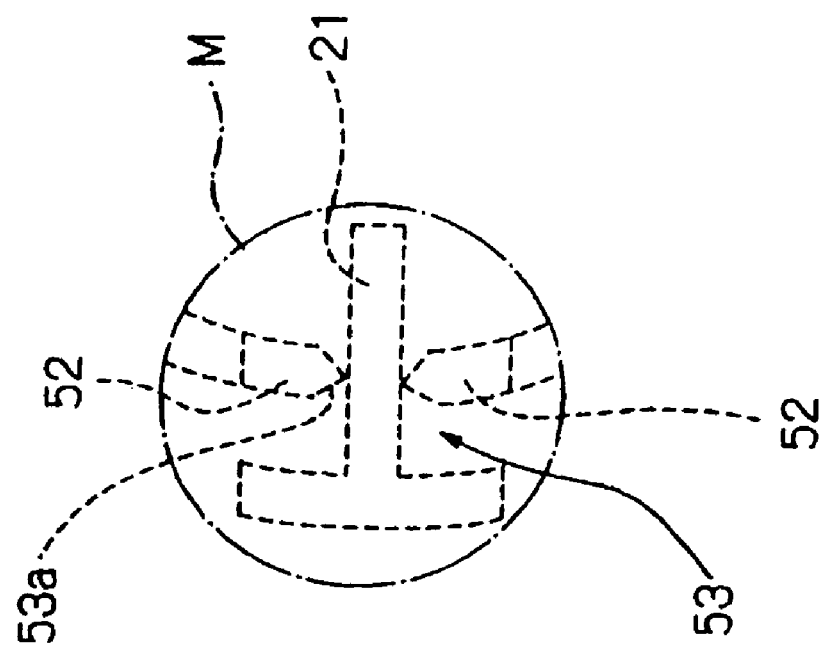
FIG. 14B is an enlarged partial view for explaining the second rib of the other gear.
Figure 14A:
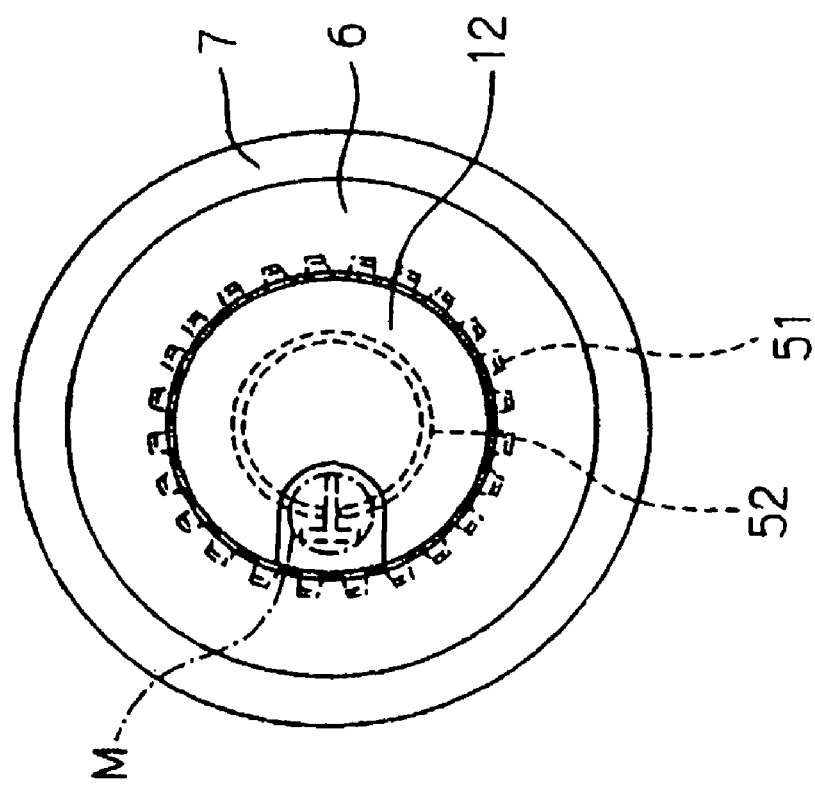
FIG. 14A is a plan view for explaining the second rib of the other gear.

As shown in FIG. 13 and FIGS. 14A and 14B, rotary operation mechanism 2 of the second embodiment is provided with gear 51 that is subjected to rotary operation by rotating knob 12.

Gear 51 is rotatably provided on apparatus main unit 5, and second rib 52 that engages with first rib 21 of rotating knob 12 is formed to project as a single unit from gear 51 and concentrically with geared part 19. This second rib 52 is formed in a substantially ring shape, one portion in the circumferential direction being cut out to form slit 53 that serves as a gap that engages rotating knob 12.

Each end surface of opening edges 53a of this slit 53 is formed with a triangular profile having its apex on the centerline of the thickness of second rib 52, whereby an angular tip is formed. In these opening edges 53a, the tip angles formed by the tips are formed by a process such as a beveling process to an angle of approximately 90 degrees. The distance between the tips of opening edges 53a of this slit 53 is formed to a prescribed distance that is the thickness t of first rib 21 of rotating knob 12 with an added prescribed clearance, i.e., with a minimum clearance.

According to rotary operation mechanism 2 of the second embodiment that is configured as described above, first rib 21 on the side of rotating knob 12 and opening edges 53a of second rib 22 on the side of gear 51 are in line contact, whereby the same operation and effects as the first embodiment are obtained.

Third Embodiment

In the above-described rotary operation mechanism 1, a configuration was adopted in which first rib 21 that is formed in a plate shape engages with slit 25 in second rib 22 that is formed in a ring shape, but the following brief explanation regards the rotary operation mechanism of the third embodiment having another gear and rotating knob in which these first and second ribs are formed in another shape. This other gear and rotating knob have basically the same configuration as above-described gear 11 and rotating knob 12, and identical parts are therefore given the same reference numerals and redundant explanation is omitted.

As shown in FIGS. 15-17A and 17B, rotary operation mechanism 3 of the third embodiment is provided with: gear 61 that is rotatably provided on apparatus main unit 5, and rotating knob 62, which is the rotary operator for effecting rotary operation of this gear 61.

Figure 15:
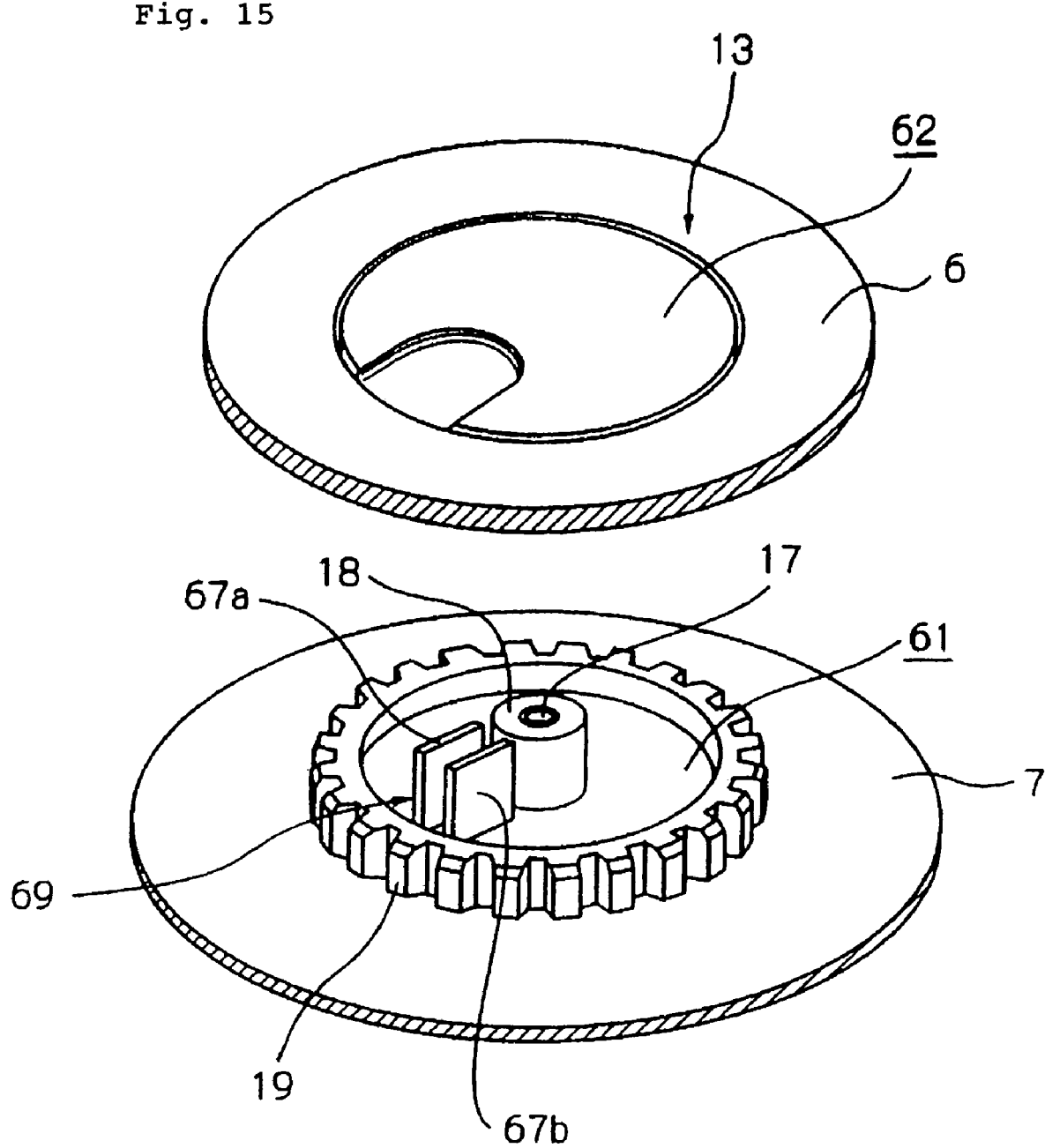
FIG. 15 is an exploded perspective view showing yet another rotary operation mechanism.

Gear 61 is rotatably provided on apparatus main unit 5, and as shown in FIG. 15 and FIG. 17, a set of second ribs 67a and 67b that engage with first rib 66 of rotating knob 62 (to be explained hereinbelow) is formed as a single unit with gear 61 along the radial direction from the center of rotation of gear 61 so as to project from gear 61.

Second ribs 67a and 67b are each formed in a plate form, are arranged to oppose each other, and together form interposed slit 69 having a gap for engagement with first rib 66 of rotating knob 62 (to be explained hereinbelow). The distance between these opposed ribs of slit 69 is formed to a prescribed distance equal to the outer diameter of first rib 66 of rotating knob 62 to which is added a prescribed clearance, i.e., having a minimum clearance.

Figure 16:
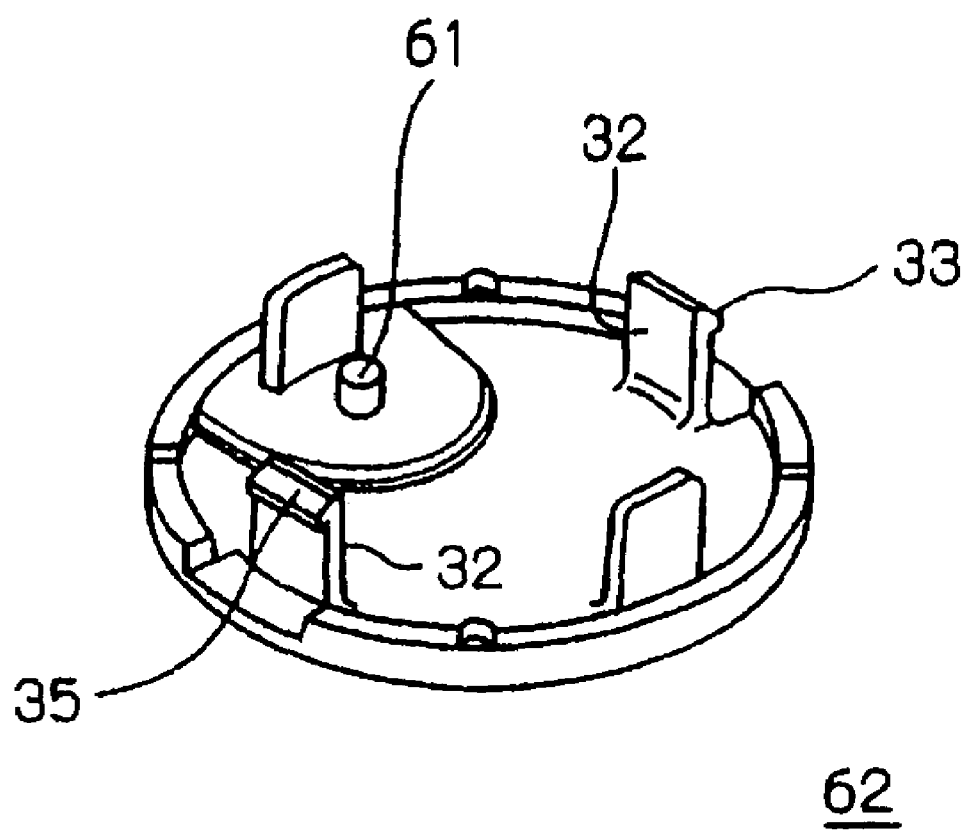
FIG. 16 is a perspective view showing the bottom of the other rotating knob.

As shown in FIG. 16 and FIG. 17, column-shaped first rib 66 that engages with second ribs 67a and 67b of gear 61 is formed to project as a single unit with rotating knob 62 on the bottom surface of rotating knob 62. This first rib 66 is formed as a single unit with rotating knob 2 to project at a position that is separated in the radial direction from the center of rotation of rotating knob 62.

According to rotary operation mechanism 3 of this third embodiment, the outer circumferential surface of first rib 66 on the side of rotating knob 62 makes line contact with slit 69 of second ribs 67a and 67b on the side of gear 61, whereby the same operation and effects as in the first embodiment are obtained.

Although an example was described in which a gear served as the rotating member that is provided in the main unit of an apparatus in the rotary operation mechanism of the above-described embodiment, another rotation part such as a rotary-type variable resistance volume may obviously be used.

In addition, although a configuration in which a second rib that constitutes a slit with which the first rib engages was formed on the side of the gear that is the rotating member in the rotary operation mechanism of the above-described embodiment, it goes without saying that a configuration may be adopted in which a second rib that constitutes a slit is formed on the side of the rotating knob that is the rotary operator.

Although certain preferred embodiments of the present invention have been shown and described in detail, it should be understood that various changes and modifications may be made without departing from the spirit or scope of the appended claims.

What is claimed is:

1. A rotary operation mechanism for operating an electronic apparatus that is provided with an apparatus main unit and a case that covers said apparatus main unit, said rotary operation mechanism comprising:
    a rotating member that is rotatably provided in said apparatus main unit;
    a rotary operator for effecting rotary operation of said rotating member; and
    an opening that is provided in said case and in which said rotary operator is inserted;
    wherein said rotary operator is supported by said case in a state of engagement that allows free rotation in said opening;
    wherein one of said rotary operator and said rotating member is provided with a first engagement part at a position that is separated in a radial direction from a center of rotation, and the other of said rotary operator and said rotating member is provided with a second engagement part having a gap in which said first engagement part is interposed and that makes contact along a line with said first engagement part and engages with said first engagement part, and
    wherein opposing surfaces of said gap in said second engagement part comprise curved surfaces.

2. The rotary operation mechanism according to claim 1, wherein said first engagement part is formed in a plate shape along said radial direction.

3. The rotary operation mechanism according to claim 2, wherein said second engagement part is formed in a ring shape, a portion in the circumferential direction of said second engagement part being cut out to provide said gap.

4. The rotary operation mechanism according to claim 3, wherein the opposing surfaces of said gap of said second engagement part are each formed in an angular shape.

5. The rotary operation mechanism according to claim 3, wherein inclined surfaces are formed in said second engagement part to guide said first engagement part into said gap.

6. An electronic apparatus comprising:
    the rotary operation mechanism according to claim 5.

7. An electronic apparatus comprising:
    the rotary operation mechanism according to claim 4.

8. An electronic apparatus comprising:
    the rotary operation mechanism according to claim 3.

9. An electronic apparatus comprising:
    the rotary operation mechanism according to claim 2.

10. The rotary operation mechanism according to claim 1, wherein said first engagement part comprises a column shape.

11. The rotary operation mechanism according to claim 10, wherein said second engagement part comprises a set of plate-shaped parts that form said gap.

12. An electronic apparatus comprising:
    the rotary operation mechanism according to claim 11.

13. An electronic apparatus comprising:
    the rotary operation mechanism according to claim 10.

14. An electronic apparatus comprising:
    the rotary operation mechanism according to claim 1.

15. A projector, comprising:
    the rotary operation mechanism according to claim 1;
    projection optics for projecting an image; and
    a drive mechanism for driving a lens that belongs to said projection optics,
    wherein said drive mechanism is operated by means of said rotary operator of said rotary operation mechanism.

16. The rotary operation mechanism according to claim 1, wherein said rotating member is formed on a rotation shaft, and one of said first and second engagement parts comprises a side surface which is engaged with line contact along a line parallel to an axial direction of said rotation shaft with the other one of said first and second engagement parts.

17. The rotary operation mechanism according to claim 1, wherein a distance between said opposing surfaces of said gap is equal to a thickness of said first engagement part.

18. A rotary operation mechanism for operating an electronic apparatus that is provided with an apparatus main unit and a case that covers said apparatus main unit, said rotary operation mechanism comprising:
    a rotating member that is rotatably provided in said apparatus main unit;
    a rotary operator for effecting rotary operation of said rotating member; and
    an opening that is provided in said case and in which said rotary operator is inserted;
    wherein said rotary operator is supported by said case in a state of engagement that allows free rotation in said opening;
    wherein one of said rotary operator and said rotating member is provided with a first engagement part at a position that is separated in a radial direction from a center of rotation, and the other of said rotary operator and said rotating member is provided with a second engagement part having a gap in which said first engagement part is interposed and that makes contact along a line with said first engagement part and engages with said first engagement part, and
    wherein a plane surface on one of said first engagement part and said second engagement part is in contact along a line with a curved surface on the other one of said first engagement part and said second engagement part.

19. A rotary operation mechanism for operating an apparatus having a case and a unit formed in said case, said mechanism comprising:
    a rotating member rotatably formed on said unit of said apparatus and comprising a first engagement part; and
    a rotary operator for rotating said rotating member, said operator being rotatably formed in an opening of said case of said apparatus and supported by said case, and comprising a second engagement part that engages said first engagement part,
    wherein one of said first and second engagement parts comprises a gap, and the other one of said first and second engagement parts is separated in a radial direction from a center of rotation and inserted into said gap and makes contact along a line with said one of said first and second engagement parts, and
    wherein opposing surfaces of said gap comprise curved surfaces.

20. The rotary operation mechanism according to claim 19, wherein said first engagement part projects from a surface of said rotating member in a direction toward said rotary operator, and said second engagement part projects from a surface of said rotary operator in a direction toward said rotating member.

21. A projector, comprising:
- projection optics comprising a lens, for projecting an image;
- a drive mechanism for driving said lens; and
- a rotary operation mechanism for operating said drive mechanism, comprising:
  - a rotating member rotatably formed in an apparatus and comprising a first engagement part; and
  - a rotary operator for rotating said rotating member, said operator being rotatably formed in an opening in said apparatus and supported by said apparatus, and comprising a second engagement part that engages said first engagement part, wherein one of said first and second engagement parts comprises a gap, and the other one of said first and second engagement parts is inserted into said gap and makes contact along a line with said one of said first and second engagement parts, and wherein opposing surfaces of said gap comprise curved surfaces.

* * * * *